United States Patent
Nagarajan et al.

(10) Patent No.: US 12,511,909 B2
(45) Date of Patent: Dec. 30, 2025

(54) OCCLUDED ONCOMING VEHICLES DETECTION SYSTEMS AND METHODS

(71) Applicant: Moovita Pte Ltd, Singapore (SG)

(72) Inventors: Karthikeyan Nagarajan, Singapore (SG); Upendra Suddamalla, Singapore (SG); Anthony Wong, Singapore (SG); Dilip Kumar Limbu, Singapore (SG)

(73) Assignee: MOOVITA PTE LTD, Singapore (SG)

( * ) Notice: Subject to any disclaimer, the term of this patent is extended or adjusted under 35 U.S.C. 154(b) by 436 days.

(21) Appl. No.: 18/047,659

(22) Filed: Oct. 19, 2022

(65) Prior Publication Data

US 2023/0122293 A1 Apr. 20, 2023

Related U.S. Application Data

(60) Provisional application No. 63/257,125, filed on Oct. 19, 2021.

(51) Int. Cl.
*G06V 20/00* (2022.01)
*B60W 40/072* (2012.01)
(Continued)

(52) U.S. Cl.
CPC .......... *G06V 20/56* (2022.01); *B60W 40/072* (2013.01); *B60W 40/105* (2013.01); *B60W 50/14* (2013.01); *B60W 60/00* (2020.02); *G06V 10/751* (2022.01); *G06V 10/764* (2022.01); *B60W 2554/80* (2020.02)

(58) Field of Classification Search
CPC .... G06V 20/56; G06V 10/751; G06V 10/764; G06V 10/25; G06V 20/58; G06V 20/584; B60W 40/072; B60W 40/105; B60W 50/14; B60W 60/00; B60W 2554/80; B60W 2420/403; B60W 60/001
See application file for complete search history.

(56) References Cited

U.S. PATENT DOCUMENTS

| | | | |
|---|---|---|---|
| 2019/0205670 A1* | 7/2019 | Ganguli | G06V 10/44 |
| 2021/0271906 A1* | 9/2021 | Creusot | G06V 20/584 |
| 2023/0368660 A1* | 11/2023 | Ghafarianzadeh | G06N 20/00 |

OTHER PUBLICATIONS

Ewecker et al, Provident Vehicle Detection at Night for Advanced Driver Assistance Systems, arXiv:2017.11302v2 Aug. 11, 2021.*
(Continued)

*Primary Examiner* — Xiao Liu
(74) *Attorney, Agent, or Firm* — HORIZON IP PTE. LTD (57) ABSTRACT

An autonomous driving system capable of detecting oncoming occluded vehicles is disclosed in low-light conditions. The system captures images which are processed and analyzed to determine bright spots in a region of interest which are related to reflections of an oncoming occluded vehicle. If an oncoming occluded vehicle is detected, the system analyzes the criticality of the situation based on a tunable threshold distance. The tunable threshold distance from the equipped vehicle (vehicle with the autonomous driving system) to the oncoming occluded vehicle. Factors for tuning the threshold distance may include curvature of the road, sharpness of the turn or occluded area, road surface conditions, speed of the equipped vehicle as well as mechanical capabilities of the equipped vehicle. If the situation is critical, the system generates a warning signal indicating a hazardous condition.

16 Claims, 6 Drawing Sheets

(51) Int. Cl.
*B60W 40/105* (2012.01)
*B60W 50/14* (2020.01)
*B60W 60/00* (2020.01)
*G06V 10/75* (2022.01)
*G06V 10/764* (2022.01)
*G06V 20/56* (2022.01)

(56) References Cited

OTHER PUBLICATIONS

Schamm et al, On-Road Vehicle Detection during Dusk and at Night, 2010 IEEE Intelligent Vehicles Symposium, University of California, San Diego, CA, USA, Jun. 21-24, 2010.*
Zhou et al, An anti-occlusion tracking system for UAV imagery based on Discriminative Scale Space Tracker and Optical Flow, IEEE 4th International Conference on Advanced Robotics and Mechatronics (ICARM) (Year: 2019).*

* cited by examiner

OCCLUDED ONCOMING VEHICLES DETECTION SYSTEMS AND METHODS

CROSS-REFERENCE TO RELATED APPLICATION

This application claims the benefit of U.S. Provisional Application Ser. No. 63/257,125, filed on Oct. 19, 2021, which is all herein incorporated by reference in its entirety for all purposes.

FIELD OF THE INVENTION

The present disclosure generally relates to advanced driver systems for vehicles. In particular, the disclosure relates to autonomous driving systems which are capable of detecting completely occluded oncoming vehicles, in low-light conditions.

BACKGROUND

Autonomous driving systems have been employed to reduce accidents. Such systems include various safety features, such as informing the driver of the equipped vehicle (vehicle equipped with the autonomous driving system) of oncoming vehicles, whether from the back, front and/or the rear of the equipped vehicle. The equipped vehicle may be an autonomous vehicle or driven by a driver.

To detect oncoming vehicles, conventional autonomous driving systems employ sensors, such as a camera, Lidar and/or a radar. However, such types of systems are incapable of detecting oncoming vehicles which are completely occluded. This is because such systems require a direct line of sight by the sensors to detect the oncoming vehicle. With a completed occluded vehicle, there is no direct line of sight for the sensors to detect. The inability to detect a completely occluded vehicle can lead to a dangerous situation because the driver may not have enough time to react to or avoid colliding with the completely occluded vehicle. This creates dangers, such as collisions.

The present disclosure is directed to autonomous driving systems and methods which can detect occluded oncoming vehicles to effect collision avoidance.

SUMMARY

In one embodiment, the disclosure relates to an autonomous vehicle system configured for an equipped vehicle. The system includes an input module which includes an image capture unit for capturing images. The system also includes an image processing module for processing an incoming image from the input module. The image processing module includes a bright blob detection unit. The bright blob detection unit processes the incoming image and generates a blob image containing bright blobs from the incoming image. The image processing module also includes a classification unit for analysing the bright blobs in a region of interest to determine if any bright blob in the ROI is associated with an oncoming occluded vehicle (OOV blob).

In another embodiment, the disclosure relates to an autonomous vehicle system configured for an equipped vehicle. The system includes an input module which includes an image capture unit for capturing images. The system also includes an image processing module for processing an incoming image from the input module. The image processing module includes a bright blob detection unit. The bright blob detection unit processes the incoming image and generates a blob image containing bright blobs from the incoming image. The image processing module also includes a semantic segmentation unit. The semantic segmentation unit classifies pixels of the incoming image into specified classes of objects based on shapes according to colors to produce a segmented image and determines a region of interest (ROI) from the segmented image. A classification unit of the processing module analyzes the bright blobs in a region of interest to determine if any bright blob in the ROI is associated with an oncoming occluded vehicle (OOV blob).

In yet another embodiment, the disclosure relates to a method for detecting an oncoming occluded vehicle (OOV) by an autonomous driving system implemented in an equipped vehicle. The method includes capturing images by an image capturing unit. An incoming image from the image capture unit is processed. Processing includes generating a blob image containing bright blobs from the incoming image. Processing also includes generating a semantic segmentation image by classifying pixels of the incoming image into specified classes of objects based on shapes according to colors. A region of interest (ROI) is determined from the segmented image. An ROI blob image is generated. The ROI blob image contains bright blobs in the ROI. A filtered ROI blob image is generated by removing bright blobs from the ROI blob image which are reflections of the equipped vehicle, leaving bright blobs associated with an OOV (an OOV blob), if any. The OOV blob is analyzed to determine if a situation is critical. An OOV warning is generated if the OOV blob results in a critical situation. These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, with emphasis instead generally being placed upon illustrating the principles of the invention. In the following description, various embodiments of the present invention are described with reference to the following drawings, in which.

DETAILED DESCRIPTION

Embodiments relate to autonomous driving systems (ADS) equipped with occluded oncoming vehicle detection (OOVD) to improve collision avoidance. The ADS may be any type of ADS. For example, the ADS may be configured: 1) to only provide a warning to the driver when a completely occluded oncoming vehicle (OOV) is detected for lower level ADS; or 2) to take over control of the vehicle when an OOV is detected for higher level ADS. In some cases, both warning the driver and taking control of the vehicle may be effected by the ADS system. The OOVD is configured to detect OOVs. In particular, the OOVD is tailored for detecting headlight reflections of OOVs in low-light conditions.

Figure 1:
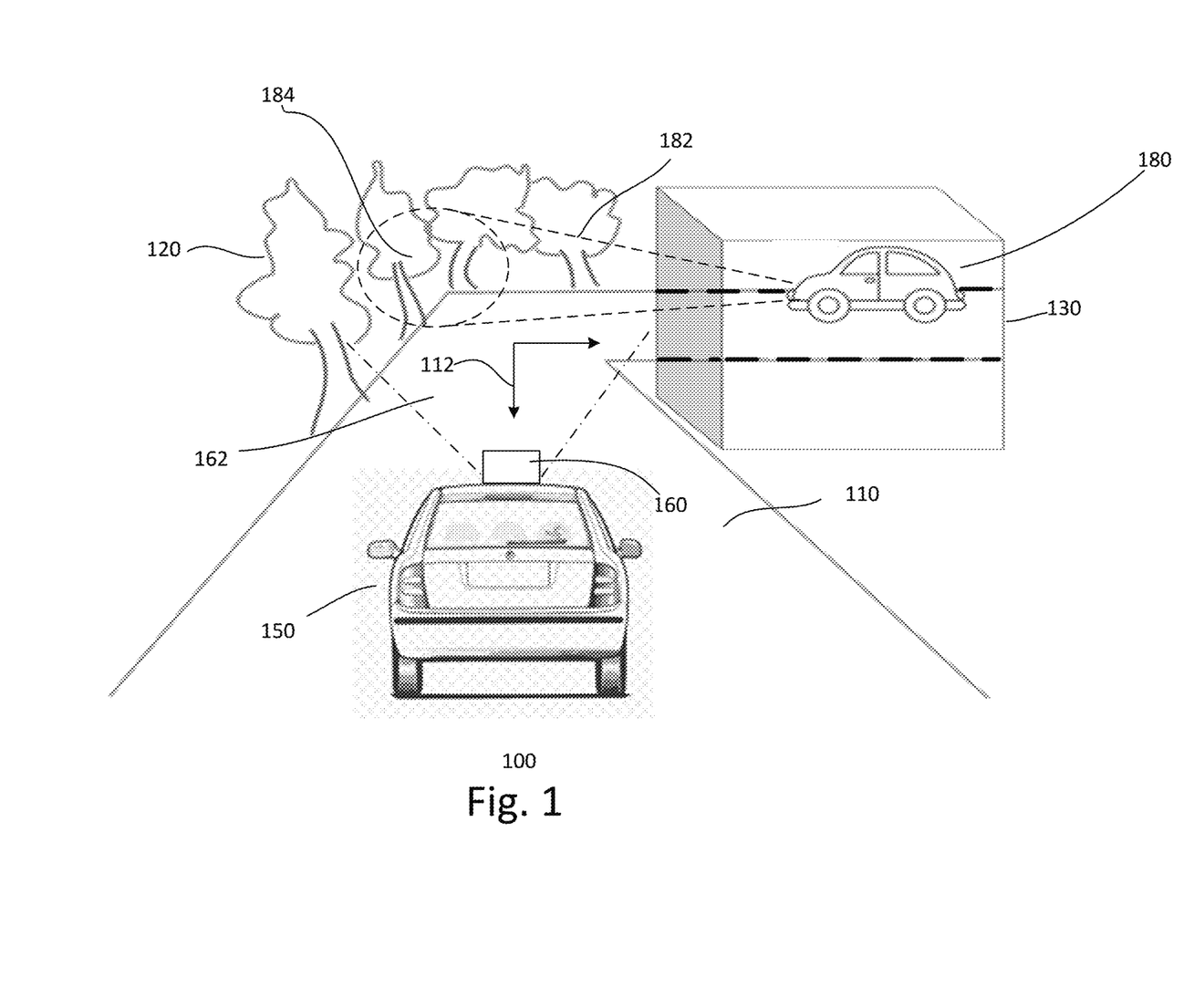
FIG. 1 illustrates a scenario for detecting occluded oncoming vehicles.

FIG. 1 illustrates an exemplary scenario 100 for detecting an OOV using an ADS configured with OOVD. For example, the ADS detects OOV in low-light conditions. A vehicle 150 equipped with the ADS system (equipped vehicle) is traveling on a two-way road 110. For example, the road will include oncoming traffic. The road includes a bend. The bend, as shown, is a right-handed bend (turning right for the equipped vehicle), as indicated by arrow 112.

The road, on one side of the equipped vehicle, includes an occluding object 130. An occluding object may include any type of object which can completely occlude an oncoming vehicle. For example, the occluding object may be a building, infrastructure, mountain, rock or tree. The occluding object may be other types of occluding objects. An occluding object may be a single occluding object or a multiplicity of occluding objects. The occluding object, for example, is at the bend or an intersection. As shown, a building is disposed at the bend on the right side of the road of the equipped vehicle. The building completely occludes an oncoming vehicle (OOV) 180 as it approaches the bend.

On the other side of the road is a reflective object 120. The reflective object, for example, may be any object that can reflect light. For example, the reflective object may be a building, infrastructure, guard rail, mountain, rock, or another vehicle. The reflective object may be other types of reflective objects. A reflective object can refer to a single reflective object or a multiplicity of reflective objects. The reflective object is located at the bend in the road. As shown, the reflective object includes trees disposed at the bend on the left side of the road of the equipped vehicle.

The OOV has its headlight or headlights on. For example, the OOV has at least one headlight on. The term "headlight beam" may collectively refer to the headlight beam or beams from the oncoming occluded vehicle. The beams of the headlights of the occluded vehicle illuminate the road in front of it, as depicted by the headlight beam envelope 182. At the turn, the headlight beam envelope reflects off the reflective object. For example, a beam reflection 184 reflects off the trees.

In one embodiment, a sensor unit of the OOVD system is configured to detect the beam reflection from the reflective object. Illustratively, the sensing unit is disposed on top of the vehicle. It is, however, understood that the sensing unit can be disposed on other locations of the vehicles to effect detecting reflections from the reflective object in front of the vehicle. As described, the reflected beam may be from one OOV or multiple OOVs. Regardless of whether it is one OOV or multiple OOVs, the ADS is configured to detect that an OOV is present.

The sensing unit, in one embodiment, includes a camera for capturing images continuously. The camera, for example, may include a digital color camera. The camera may be fitted with a wide-angle lens to increase the image capture width or envelope 162. The camera may be any camera employed in a conventional sensing unit of an ADS. Other types of sensing units may also be useful.

The ADS with OOVD includes a processing module. The processing module may be located with other control units of the equipped vehicle. Other locations for the processing module of the ADS may also be useful. The processing module processes the captured images from the sensing unit and analyzes them to determine if there is an oncoming occluded vehicle. The processing module can determine both spatial and temporal variations of the images captured by the sensing unit. The processing module differentiates the reflections of headlights of an OVD from that of non-completely occluded vehicles, such as directly oncoming vehicles, and the equipped vehicle as well as other static light sources, like streetlights or building lights. Based on the detection result, the ADS, such as a low-level ADS which does not have control of the vehicle, warns the driver of the presence of an occluded oncoming vehicle. In the case the ADS is a high-level ADS configured with the capability of taking control of the vehicle, it may cause the equipped vehicle to brake accordingly to reduce the risk of collision with an OOV.

Figure 2:
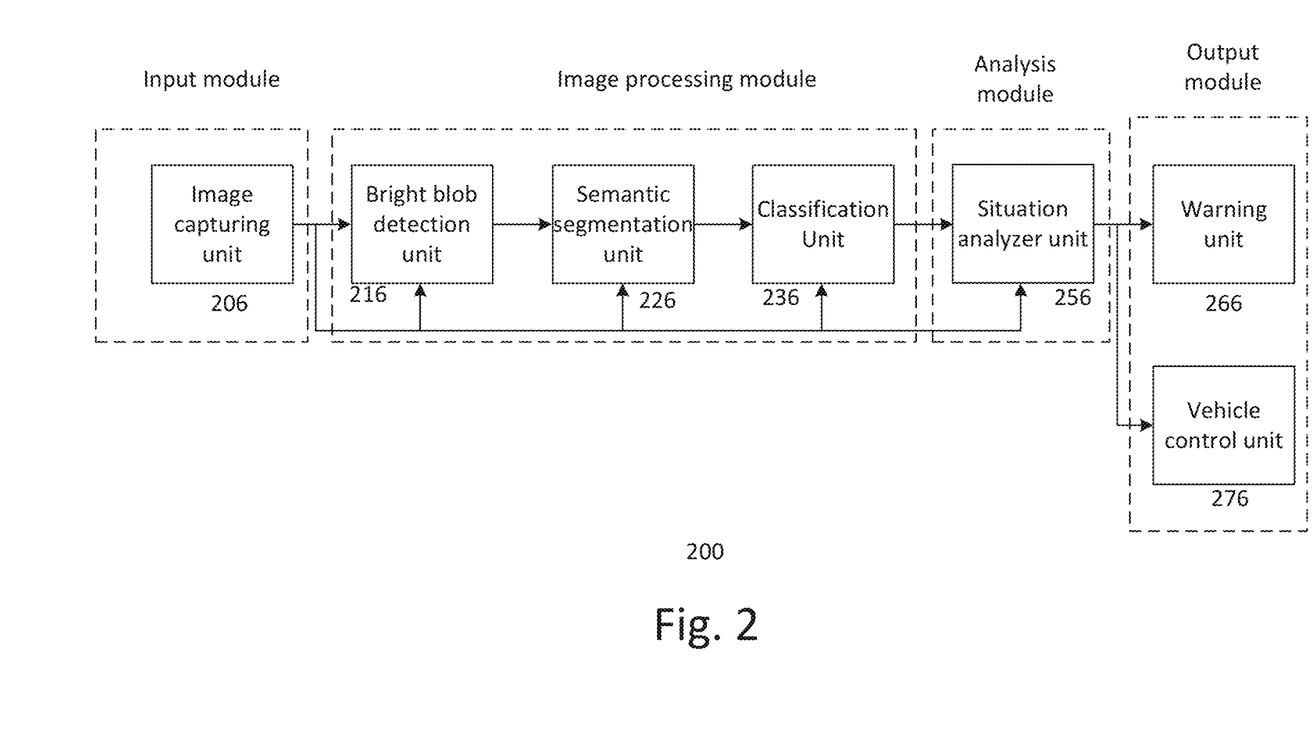
FIG. 2 shows a simplified block diagram of an embodiment of an occluded oncoming vehicle detection system.

FIG. 2 shows a simplified block diagram of an OOVD sub-system 200 of an ADS. As shown, the OOVD sub-system includes an input module, an image processing module, an analysis module and an output module. Providing the system with other modules may also be useful.

The input module or sensing module includes an image-capturing unit 206. The image-capturing unit, in one embodiment, includes a camera unit, such as a digital camera. The digital camera, for example, may be a CCD camera. The digital camera is configured to capture digital images. In one embodiment, the digital camera is a color camera, such as an RGB-based camera. Other types of camera units may also be useful. The camera unit may be fitted with a wide-angle lens to increase the image capture width or envelope. In addition, the camera unit may be equipped with an autofocus feature to ensure the sharpness of the captured image. The camera unit, for example, may be any camera unit available with conventional ADS without an OOVD subsystem. The sensing module, in one embodiment, is configured to capture images at a high rate.

The captured images are processed by the image processing module. In one embodiment, the image processing module includes a bright blob detection unit 216, a semantic segmentation unit 226 and a classification unit 236.

In one embodiment, the bright blob detection unit identifies bright light spots in an image. For example, the bright light spots or blobs may include headlights, streetlights, reflections, building lights and other roadside light sources. The output of the bright blob detection unit is a blob image with bright spots. The blobs may be represented in various forms. For example, the blobs may be represented as a bit map, such as 0 for non-blobs and 1 for blobs. The blobs may alternatively be represented as a series or list of contours defined by a series of points. Other techniques for representing the blobs may also be useful. In one embodiment, after image processing, thresholding may be employed to identify the blobs. For example, pixels or points exceeding a threshold value may be defined as blobs while those at or below the threshold may be non-blobs. Other thresholding techniques for blob detection may also be useful. It is understood that additional image processing steps may be performed before and after thresholding.

The semantic segmentation unit classifies pixels of an image into specified classes. For example, the segmentation unit classifies each pixel of the image into a specified class. The classification is at the pixel level. In one embodiment, classification is based on shapes. For example, the pixel may be classified as a tree, sky, road surface, car as well as other objects. Classification may be achieved using, for example, deep learning models. The output of the semantic segmentation unit is an image with colors corresponding to different classes in the image.

The segmentation unit determines a region of interest (ROI) using the segmented image. For example, an ROI mask is calculated from the segmented image. The ROI may be represented in various forms. For example, the ROI may be represented by a list of contours (series of points) or a bit map. Other techniques for representing the ROI may also be useful. Once the ROI mask is calculated, the segmented image is not needed anymore. The segmented image may be kept or stored for visualization purposes. The blob image is processed with the ROI mask to produce an ROI blob image. For example, blobs outside the ROI are removed from the blob image. The ROI blob image includes only blobs that are within the ROI. Various techniques may be employed to process the blob image. Such techniques, for example, may include overlying the ROI mask over the blob image. Other techniques which do not include overlying the ROI mask on the blob image may also be useful.

The classification unit, in one embodiment, processes incoming images from the input module and output of the semantic segmentation unit to filter out irrelevant blobs from the ROI blob image. In one embodiment, blobs are classified as reflections originating from headlight beams of oncoming occluded vehicles and the equipped vehicle. The reflections from the equipped vehicle are irrelevant and are filtered out. This leaves blobs from the OOV, if any. A blob from an OOV, for example, may be a reflection on guard rails, buildings, trees or other roadside objects. The output of the classification unit is a filtered ROI blob image.

The analysis module analyzes the filtered ROI blob image to determine if it contains a blob from an OOV. The analysis module includes a situation analyzer unit 256. In the event that the filtered ROI image contains a blob from an OOV, the situation analyzer analyzes the OOV bright spot to determine the criticality of the situation. Depending on the criticality of the situation, the situation analyzer may or may not raise an alert. For example, if the situation is critical, such as the equipped vehicle is at or below a threshold distance from the OOV (intersection or bend on the road of OOV), the situation analyzer generates an OOV warning signal to the output module. On the other hand, if the situation is not critical, such as when the distance of the equipped vehicle to the OOV is greater than the threshold distance, no warning signal is generated. Other factors may also be employed to determine the criticality of the situation. In some embodiments, the speed of the equipped vehicle and the sharpness of the bend or turn along with threshold distance may factor in the determination of the criticality of the situation. For example, the threshold distance may be increased or decreased based on the sharpness of the bend as well as on the speed of the equipped vehicle. Other techniques for determining the criticality of the system may also be useful.

The output module may include a warning unit 266 and/or a vehicle control unit 276. For example, in the case of a low level ADS (cannot take control of the vehicle), it includes the warning unit. Alternatively, if the ADS is a higher level ADS (can take control of the equipped vehicle) the ADS, includes a vehicle control unit. In some embodiments, the higher level ADS can include both the warning unit and the vehicle control unit. In one embodiment, the OOV warning signal causes the warning unit to activate a warning signal to the driver of the vehicle of the presence of an OOV. The warning signal may be an audio or visual warning, such as a voice message alarm or blinking LED lights. Other types of warnings may also be useful. As for the vehicle control unit, the OOV warning signal causes the equipped vehicle to brake accordingly, such as slowing down or even stopping, depending on the situation. In one embodiment, the ADS may employ existing protocols in the event a safety risk is detected.

Figure 3:
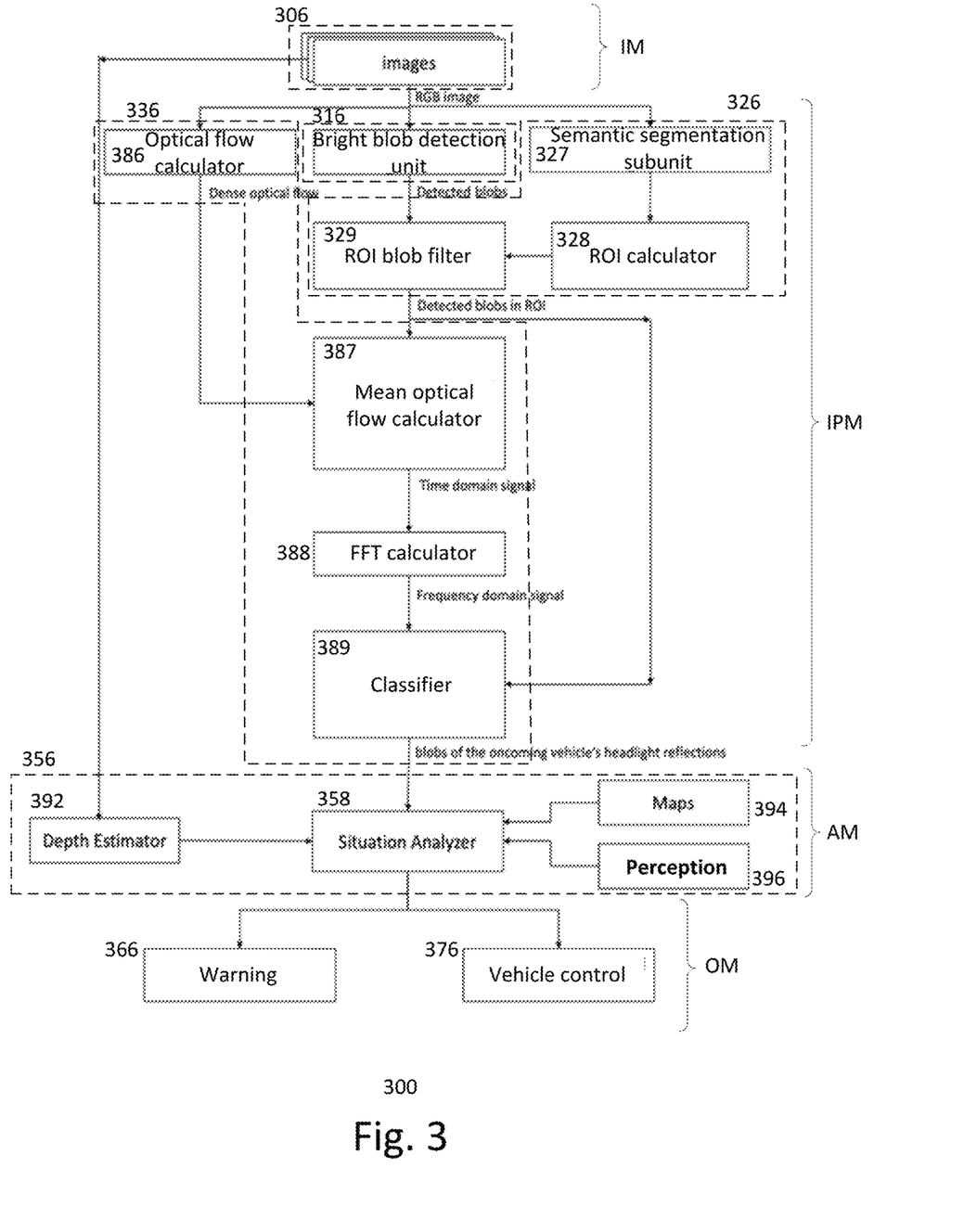
FIG. 3 shows a block diagram of a detailed embodiment of an occluded oncoming vehicle detection system.

FIG. 3 shows a block diagram of an OOVD system 300. Furthermore, the block diagram depicts the flow of the OOVD system. The OOVD system is similar to that described in FIG. 2 but shown in greater detail. Common elements may not be described or described in detail. As shown, the OOVD system includes an input module IM, an image processing module IPM, an analysis module AM and an output module OM. Providing the system with other modules may also be useful.

The input module includes an image capture unit which captures images in front of the equipped vehicle. The image capture unit captures digital images. The digital images may be captured at a sufficient rate to perform optical flow analysis. For example, the image capture rate may be from about 0.2 or 0.5 to a few seconds. Other image capture rates may also be useful. In some embodiments, the image capture rate may be determined once the image capture unit is implemented on the equipped vehicle. The image capture unit may be one employed in conventional ADSs. For example, the image capture rate may be preset for the ADS. Other types of image capture units may also be useful.

The images from the input module are processed by the image processing module as well as the analysis module. The image processing module, in one embodiment, includes a bright blob detection unit 316, a semantic segmentation unit 326 and a classification unit 336. In one embodiment, the images are processed in parallel to effect optical flow analysis. For example, the images are processed in parallel by the bright blob detection unit and the semantic segmentation filter unit. The images processed by the bright blob detection and semantic segmentation units are provided to the classification unit.

In one embodiment, the bright blob detection unit identifies blobs or bright light spots in an image. For example, the bright light spots may include headlights, streetlights, reflections, building lights and other roadside light sources. In one embodiment, blob detection may employ image preprocessing pipeline techniques, such as Gaussian Blur. For example, GaussianBlur☐ Adaptive Threshold☐findContours can be employed. Pixels exceeding a threshold intensity level are classified as blobs and the contours of the blobs are defined. The threshold intensity value may be calculated adaptively for different parts of the scene. Other techniques for blob detection may also be useful. The output of the bright blob detector is a blob image.

The semantic segmentation filter unit, in one embodiment, includes a semantic segmentation subunit 327, an ROI calculator 328 and an ROI blob filter 329. The semantic segmentation subunit, in one embodiment, processes the incoming RGB image.

Processing includes classifying the pixels of the incoming image into specified classes. For example, the segmentation subunit classifies each pixel of the image into a specified class. The classification, in one embodiment, is based on shapes. For example, the pixel may be classified as a tree, sky, road surface, car as well as other objects. Classification may be achieved using, for example, deep learning models. The output of the semantic segmentation subunit is a segmented image with different colors corresponding to different classes in the image. The colors related to the different classes may be predefined. The contours of the classes are defined at the interface or boundary of different colors. Other techniques may also be employed to classify the image into different objects at the pixel level.

The ROI calculator calculates the region of interest (ROI) using the segmented image. In one embodiment, the ROI is calculated by merging the regions of the road, sidewalk, guardrails and other road boundary protection which is not a light source. For example, the ROI classes and associated colors are predefined. The ROI calculator selects the predetermined ROI contours as the ROI. In one embodiment, the road itself is not part of the ROI. The ROI serves as an ROI mask for filtering out blobs from outside of the ROI. The ROI may be represented as a bit map. For example, pixels in the ROI are designated as 1 while pixels outside of the ROI are designated as 0. Other techniques, such as a list of contours, can also be employed to represent the ROI.

In one embodiment, the blob image from the bright blob detection unit is processed with the ROI mask. For example, the ROI mask is employed to remove blobs outside of the ROI to produce an ROI blob image. Various techniques may be employed to remove the blobs outside of the ROI using the ROI mask. Such techniques may include, for example, superimposing the ROI mask onto the blob image. For example, blobs in "1" pixels are kept while blobs in "0" pixels are removed. Other techniques which do not include superimposing the ROI mask onto the blob image to remove the blobs outside of the ROI may also be useful.

With respect to the classification unit, it includes an optical flow calculator 386, a mean optical flow calculator 387, an FFT calculator 388 and a classifier 389. In one embodiment, the classification unit employs flow analysis to determine irrelevant blobs within the region of interest. For example, headlight reflections of the equipped vehicle and reflections from OOV are distinguished. The reflections of the equipped vehicle are removed, leaving reflections of OOV, if any.

In one embodiment, the optical flow calculator employs optical flow analysis to determine the apparent motion in the scene. The flow analysis compares two consecutive incoming images to determine apparent motion in the incoming images. For example, each incoming image corresponds to a given time step. Two consecutive images relate to 2 consecutive time steps. The apparent flow is represented by the direction and amount (magnitude) of motion, indicating the motion of a particular object or area of the scene between the two images. This motion is the aggregate of motion of the equipped vehicle and the object of interest. For static areas of the scene, apparent motion is due to the equipped vehicle's motion. In one embodiment, the optical flow analysis is a dense optical flow analysis. The optical flow analysis, for example, may include calcOpticalFlowFarneback analysis. Other types of optical flow or motion analysis may also be useful. The output of the optical flow calculator, in one embodiment, includes motion vectors of two consecutive incoming images.

The output of the optical flow calculator is fed to the mean optical flow calculator along with the ROI blob image from the ROI blob filter. The mean optical flow calculator calculates the mean optical flow for the detected blobs in the ROI blob image along the X and Y axis for n seconds, where n is the time duration during which the optical flow value is calculated. In one embodiment, n may be about 2 seconds. Other values of n may also be useful. For example, n may be from 0.5 to a few seconds. The value n may be tuned by experimentation. The output of the mean optical flow calculator is a time domain signal. The time domain signal is converted into a frequency domain signal using the FFT calculator. For example, Fast Fourier Transform (FFT) is employed to convert the time domain signal to a frequency domain signal. The frequency domain signal improves classifier performance compared to the time domain signal.

In one embodiment, the output of the FFT calculator is passed to the classifier. The classifier is configured to remove the headlight reflections of the equipped vehicle. This leaves headlight reflections of OOV, if any. In one embodiment, machine learning is employed to train and classify if a given FFT signal corresponding to the time series of headlight reflections belongs to the equipped vehicle or not. For example, classification techniques, such as support vector machine (SVM) learning, may be employed. Other types of machine learning classification may also be employed. The blobs that are identified as the reflections of the equipped vehicle are filtered out to prevent false positives. For example, reflections that are static relative to the equipped vehicle are reflections from the equipped vehicle. As such, these blobs are filtered out. The output of the classifier includes blobs of the OOV's headlight reflections, if any.

The analysis module, in one embodiment, includes a situation analyzer 358, a depth estimator 392, a maps unit 394 and a perception unit 396. Providing the analysis module with other units may also be useful. The analysis module processes the inputs to determine if there is an occluded oncoming vehicle or not.

The depth estimator processes the incoming images from the input module. The depth estimator estimates the distance of different objects in the incoming image with respect to the equipped vehicle. In one embodiment, depth estimation is achieved using homography to model the ground plane. Other techniques for depth estimation may also be useful. For example, deep learning-based depth estimation techniques, such as Monodepth2 or EPCdepth, can be employed to estimate the 3D projection of the object and surfaces. In some embodiments, both homography and deep learning techniques can be applied together to achieve greater accuracy. Alternatively, radar or lidar may be used to provide 3D data for estimating the depth of objects up to long distances. Other techniques may also be employed to estimate the depth or distance of objects from the equipped vehicle. The output of the depth estimator is provided to the situation analyzer.

The maps unit provides mapping information to the situation analyzer. In one embodiment, the maps unit provides information of the area in which the equipped vehicle is located. For example, the equipped vehicle includes a global positioning system indicating the location of the vehicle. The maps unit provides information, such as road curvature and road infrastructure like the possible presence of occluding objects (tall buildings, mountain ranges and other occluding objects provided by the map provider) to the situation analyzer to assess the riskiness or criticality of the situation. For example, the information may indicate whether or not the equipped vehicle is approaching an acute turn with many occlusions along the roadside.

The perception unit employs various state-of-the-art sensors of the equipped vehicle to acquire relevant information, such as cameras, Lidar, and radar to detect objects around the equipped vehicle. The perception unit also provides information associated with the detected objects, such as position, speed, orientation and type (e.g., pedestrian, bus, other vehicles, or other types of objects). Other types of information or data may also be captured by the perception unit. The information captured by the perception unit is provided to the situation analyzer.

The situation analyzer is an interfacing unit that integrates the image processing module IPM with the existing ADS stack. In one embodiment, the situation analyzer analyzes the information from the classifier unit, the depth estimator, the maps unit and the perception unit. In the event the ROI blob image from the classifier includes a blob from an OOV, the situation analyzer determines the criticality of the situation based on information from the depth estimator, maps unit and perception unit. Depending on the criticality of the situation, the situation analyzer may or may not raise an alert. If the situation analyzer determines that the blob from the OOV is critical, an OOV warning signal is generated. No warning signal is generated if the OOV blob is non-critical.

Criticality, for example, may be based on a dynamic threshold distance that the equipped vehicle is to the occluded vehicle. The dynamic threshold distance may be based on, for example, the sharpness of the curve, the number of lanes of the road, road surface conditions and the velocity of the equipped vehicle. Other factors may also be employed to determine the criticality or adjust the dynamic threshold distance. The situation is critical if the equipped vehicle is at or below the threshold distance to the occluded vehicle. Other techniques for determining criticality may also be useful.

The output module may include a warning unit 366 and/or a vehicle control unit 376. For example, in the case of a low level ADS (cannot take control of the vehicle), it includes the warning unit. Alternatively, if the ADS is a higher level ADS (can take control of the equipped vehicle), the ADS includes a vehicle control unit. The higher level ADS can, in some embodiments, include both the warning unit and the vehicle control unit. In one embodiment, the OOV detected signal causes the warning unit to activate a warning signal to the driver of the vehicle of the presence of an OOV. The warning signal may be an audio or visual warning, such as a voice message alarm or blinking LED lights. Other types of warnings may also be useful. As for the vehicle control unit, the OOV detected signal causes the equipped vehicle to brake accordingly, such as slowing down or even stopping, depending on the situation. In one embodiment, the ADS may employ existing protocols in the event a safety risk is detected.

Figure 4:
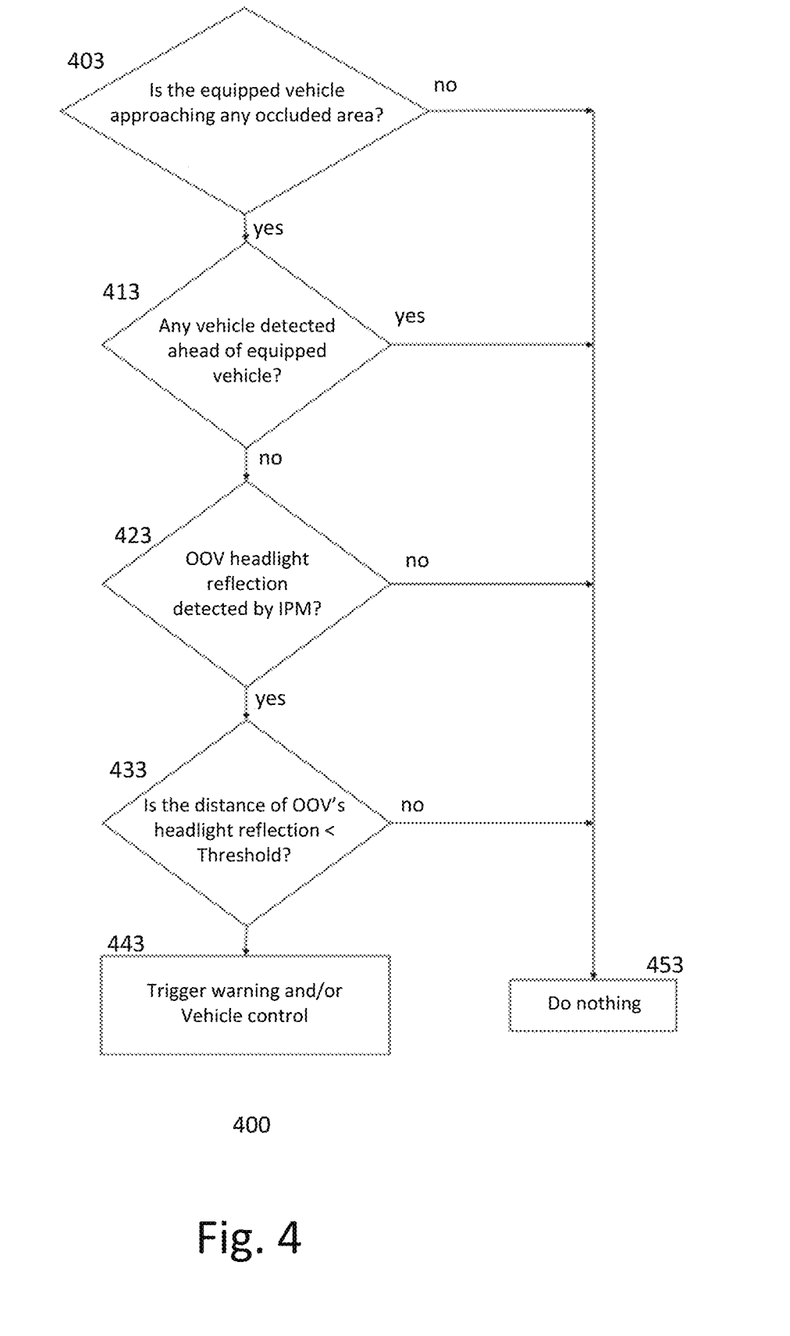
FIG. 4 shows a simplified flow diagram of an embodiment of a situation analyzer.

FIG. 4 shows a simplified process flow 400 of an embodiment of a situation analyzer. The situation analyzer, as discussed, determines if the situation is critical or not when an OOV is detected, In one embodiment, the criticality of the situation is determined based on information provided by the depth estimator, the maps unit and the perception unit.

At 403, the situation analyzer analyzes information from the maps unit and perception unit to determine if the equipped vehicle is approaching an occluded area. An occluded area may be a turn or an intersection that is occluded based on the information obtained from the maps unit. For example, based on information, the situation analyzer determines if the equipped vehicle is approaching an acute turn or coming out of a building or intersection. The maps unit, for example, includes an annotated map. The annotated map includes information, such as road curvature and road infrastructures, including possible occluding objects. The perception unit detects objects around the equipped vehicle and associated information about the detected objects, such as position, speed, orientation and type. The occluded area may be occluded by a roadside infrastructure or other objects. If the information from the maps unit does not indicate an upcoming occluded area, the process continues to 453 and does nothing. For example, the process loops back to the beginning, to 403. If the situation analyzer determines that there is an upcoming occluded area, the process proceeds to 413.

At 413, the situation analyzer analyzes the information from the perception unit to determine if there are any vehicles detected ahead of the equipped vehicle between the equipped vehicle and the occluded area. The vehicle may be approaching or traveling in the same direction. For example, based on the sensor data, such as from cameras, Lidar, radar and other sensors, the situation analyzer can determine the presence of a vehicle between the equipped vehicle and the occluded area. If no vehicle is detected, the process proceeds to 423. If the situation analyzer determines from the sensor information the presence of a vehicle, the process continues to 453.

In one embodiment, at 423, the situation analyzer analyzes the information from the image processing module to determine if a blob from an OOV is detected. For example, based on the output from the classifier unit, the situation analyzer can determine if a reflection from an OOV is detected. If no blob from an OOV is detected, the process proceeds to 453. If a blob from an OOV is detected, the process continues to 433.

The situation analyzer at 433 analyzes the information from the depth estimator, maps unit and perception unit to determine if the detected OOV presents a critical situation or not. In one embodiment, criticality is based on a dynamic threshold distance that the equipped vehicle is to the occluded vehicle. The dynamic threshold distance may be based on, for example, the sharpness of the curve, the number of lanes of the road, road surface conditions and the velocity of the equipped vehicle. Other factors, such as mechanical capability, such as braking and steering of the equipped vehicle may also be employed to determine the criticality or adjust the dynamic threshold distance. The situation is critical if the equipped vehicle is at or below the threshold distance to the occluded vehicle. Other techniques for determining criticality may also be useful. If the situation is not critical, the process proceeds to 453. If the situation is critical, the process proceeds to 443.

The situation analyzer, at 443, triggers a warning unit and/or vehicle control unit signal to cause the equipped vehicle to brake. For example, for low-level ADSs, such as level 2 or lower, the warning unit is activated. In the case of higher level ADSs, such as level 3 or higher, the ADS exerts control over the vehicle using existing modules of the AV stack. For example, the vehicle control takes necessary action, such as braking. In some embodiments, both warning and vehicle control can be activated.

Figure 5:
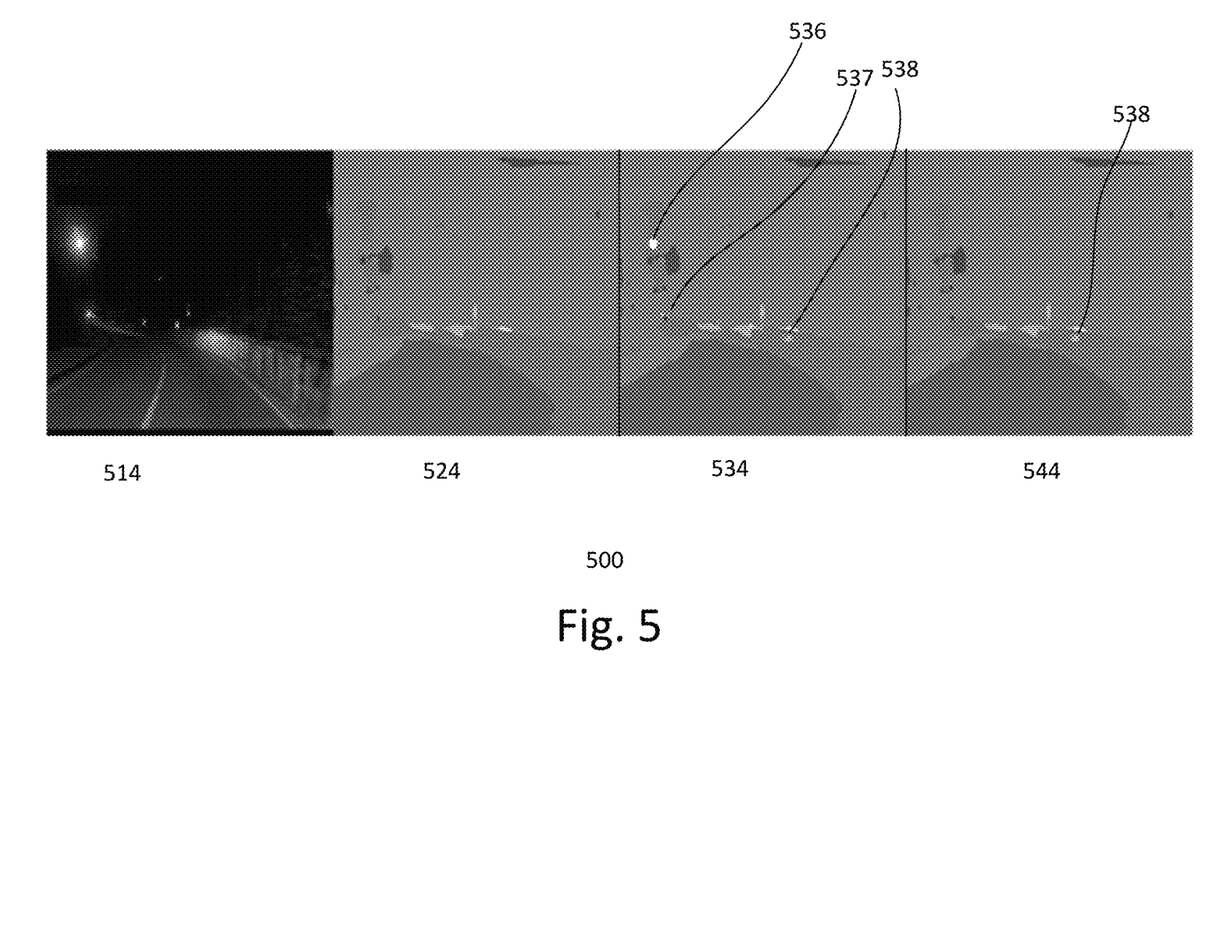
FIGS. 5-6 shows examples of processing by an ADS with OOVD.

FIG. 5 shows an example of processing 500 by an ADS with OOVD. An image 514 is shown. The image is a night image of a road. The image includes bright spots and reflections. The image is processed by the semantic segmentation unit to produce a segmented image 524. For example, the pixels are classified into specified classes represented by different colors. In one embodiment, classes and colors are predetermined. The segmented image is employed by the ROI calculator to generate an ROI mask. The image is also processed by the bright blob detection unit to produce a blob image. Image 534 illustrates the blob image superimposed onto the segmented image. As shown, the image includes blobs 536, 537 and 538. The blob image is processed by the ROI blob filter, resulting in blobs outside of the ROI being removed. As illustrated by image 544, the blobs in image 534 outside of the ROI are removed, leaving blob 538.

Blob 538 could be from an OOV or equipped vehicle. If the blob is related to the reflection of the equipped vehicle, it will be removed during subsequent reflection filtering by the classifier. Otherwise, it remains to indicate that it is a reflection from an OOV.

Figure 6:
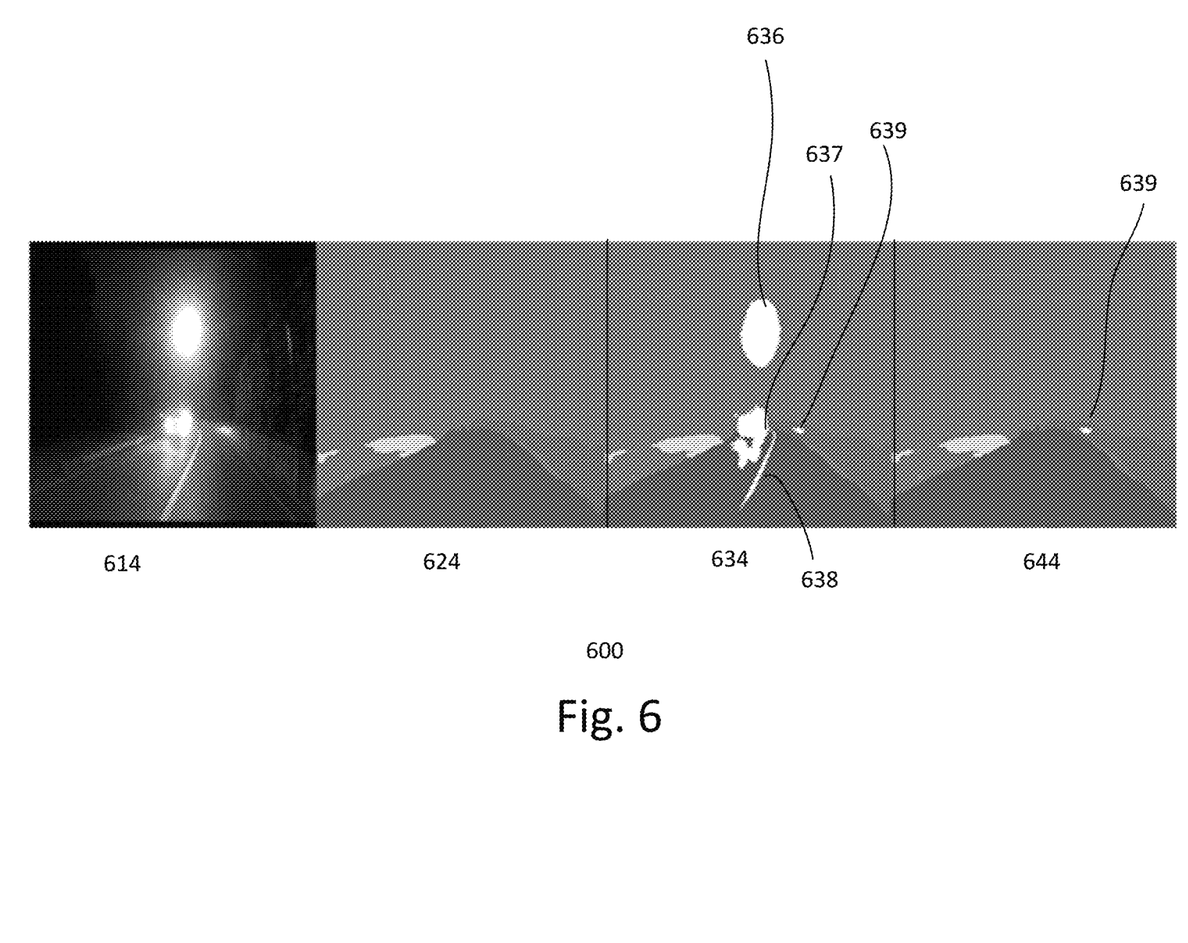

FIG. 6 shows another example of processing 600 by an ADS with OOVD. An image 614 is shown. The image includes bright spots and reflections. The image is processed by the semantic segmentation unit to produce a segmented image 624. For example, the pixels are classified to specify classes represented by different colors. The classes and colors are predetermined. The segmented image is employed by the ROI calculator to generate an ROI mask. The image is also processed by the bright blob detector to produce a blob image.

Image 634 illustrates the blog image superimposed onto the segmented image. As shown, the image includes blobs 636, 637, 638 and 639. The image is processed by the ROI blob filter, resulting in blobs outside of the ROI being removed. As illustrated by image 644, the blobs in image 634 outside of the ROI are removed, leaving blob 639. Blob 639 corresponds to reflections from an OOV. Based on the analysis module, the situation analyzer determines that the OOV, which is completely occluded behind the front oncoming vehicle (visible one), does not pose a hazard. As such, no warning signal is generated. However, if the analysis module determines that the situation is hazardous, an OOV warning signal is generated. For example, the analysis module determines the situation is risky because there could be the possibility of overtaking by the occluded vehicle.

The present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

What is claimed is:

1. An autonomous vehicle system configured for a vehicle (an equipped vehicle) comprising:
   an input module, the input module includes an image capture unit for capturing images;
   an image processing module for processing an incoming image from the input module, wherein the image processing module includes
      a bright blob detection unit, the bright blob detection unit processes the incoming image and generates a blob image containing bright blobs from the incoming image, and
      a classification unit, the classification unit analyzes bright blobs in a region of interest (ROI) to determine if any bright blob in the ROI region is associated with an oncoming occluded vehicle (an OOV blob), wherein the classification unit includes
         an optical flow calculator, the optical flow calculator employs optical flow analysis to determine apparent motion in incoming images,
         a mean optical flow calculator, the mean optical flow calculator processes an output from the optical flow calculator and from the semantic segmentation unit to determine a mean optical flow for detected blobs in the ROI of the blob image,
         a Fast Fourier Transform (FFT) calculator, the Fast Fourier Transform (FFT) calculator processes a time domain output signal from the mean optical flow calculator by converting it to a frequency domain signal, and
         a classifier, the classifier is configured to remove headlight reflections of the equipped vehicle from the bright blobs in the ROI, leaving headlight reflections of OOV, if any.

2. The system of claim 1 wherein the image processing module comprises:
   a semantic segmentation unit, the semantic segmentation unit classifies pixels of the incoming image into specified classes of objects based on shapes according to colors to produce a segmented image and determining a region of interest (ROI) from the segmented image; and
   an ROI calculator, the ROI calculator generates an ROI mask corresponding to the ROI, wherein the ROI mask is configured to generate an ROI blob image in which bright blobs of the blob image outside of the ROI are removed, the ROI blob image is provided to the classifier unit for analysis to detect the OOV blob.

3. The system of claim 1 comprises an analysis module, wherein the analysis module comprises a situation analyzer for analyzing if a situation is critical or not when the ROI image contains the OOV blob, the analysis module generates an OOV warning signal if the situation is determined to be critical.

4. The system of claim 3 comprises an output module, wherein the output module comprises at least one of:
   a warning unit, the warning unit generates a warning to a driver of the OOV in response to the OOV warning signal; and
   a vehicle control unit takes appropriate control of the equipped vehicle in response of the OOV warning signal.

5. An autonomous vehicle system configured for a vehicle (an equipped vehicle) comprising:
   an input module, the input module includes an image capture unit for capturing images;
   an image processing module for processing an incoming image from the input module, wherein the image processing module includes
      a bright blob detection unit, the bright blob detection unit processes the incoming image and generates a blob image containing bright blobs from the incoming image, and
      a semantic segmentation unit, the semantic segmentation unit classifies pixels of the incoming image into specified classes of objects based on shapes according to colors to produce a segmented image and determines a region of interest (ROI) from the segmented image;
      a classification unit, the classification unit analyzes bright blobs in the ROI region to determine if any bright blob in the ROI region is associated with an oncoming occluded vehicle (an OOV blob), wherein the classification unit includes
         an optical flow calculator, the optical flow calculator employs optical flow analysis to determine apparent motion in incoming images,
         a mean optical flow calculator, the mean optical flow calculator processes an output from the optical flow calculator and from the semantic segmentation unit to determine a mean optical flow for detected blobs in the ROI of the blob image,
         a Fast Fourier Transform (FFT) calculator, the Fast Fourier Transform (FFT) calculator processes a time domain output signal from the mean optical flow calculator by converting it to a frequency domain signal, and a classifier, the classifier is configured to remove headlight reflections of the equipped vehicle from the bright blobs in the ROI, leaving headlight reflections of OOV, if any; and an analysis module for analyzing if a situation is critical or not when the OOV blob is detected by the classification unit, the analysis module generates an OOV warning signal if the situation is determined as critical.

6. The system of claim 5 comprises an output module, wherein the output module comprises at least one of:

a warning unit, the warning unit generates a warning to a driver of the OOV in response to the OOV warning signal; and a vehicle control unit takes appropriate control of the equipped vehicle in response of the OOV warning signal.

7. The system of claim 5 wherein the analysis module comprises a situation analyzer, wherein the situation analyzer determines that the situation is critical if the distance of the equipped vehicle to the OOV is within a threshold distance.

8. The system of claim 5 wherein the analysis module comprises:

a depth estimator, the depth estimator is configured to process incoming image from to estimate distances of different objects in the incoming images with respect to the equipped vehicle;

a maps unit provides information, including road curvature and road infrastructures to indicate the presence of occluding objects; and a perception unit comprises sensors for acquiring information associated with detected objects, including position, speed, orientation and type;

a situation analyzer, wherein the situation analyzer analyzes information from the depth estimator, maps unit, perception unit and from the processing module to determine if the situation is critical of not, wherein the situation analyzer determines that the situation is critical if the distance of the equipped vehicle to the OOV is within a threshold distance.

9. The system of claim 8 wherein the threshold distance comprises a dynamic threshold distance which can increase or decrease based on threshold distance factors according to information from the depth estimator, the maps unit and the perception unit.

10. The system of claim 9 wherein the threshold distance factors comprise a curvature of a road, sharpness of a turn, road surface conditions, speed of the equipped vehicle, mechanical capabilities of the equipped vehicle or a combination thereof.

11. The system of claim 5 wherein the semantic segmentation unit comprises:

a semantic segmentation subunit, the semantic segmentation subunit classifies pixels of the incoming image into specified classes of objects based on shapes according to colors to produce a segmented image;

an ROI calculator, the ROI calculator generates an ROI mask corresponding to the ROI from the segmented image; and an ROI blob filter, the ROI blob filter generates an ROI blob image using the ROI mask to filter out bright blobs in the blob image which are outside of the ROI mask, wherein the ROI blob image is analyzed by the analysis module.

12. A method for detecting an oncoming occluded vehicle (OOV) by an autonomous driving system implemented in an equipped vehicle;

capturing images by an image capturing unit; and processing the incoming images from the image capture unit, wherein processing comprises generating blob images containing bright blobs from the incoming images, generating semantic segmentation images by classifying pixels of the incoming images into specified classes of objects based on shapes according to colors, determining a region of interest (ROI) from the segmented images, generating ROI blob images which contain bright blobs in the ROI, performing optical flow analysis on the ROI blob images, performing mean optical flow analysis on the optical flow analyzed ROI blob images, transforming output of the mean flow analysis to a frequency domain signal using a Fast Fourier Transform (FFT) calculator, removing bright blobs which are reflections of the equipped vehicle, leaving bright blobs associated with an OOV (an OOV blob), if any, analyzing the OOV blob, if present, to determine if a situation is critical, and generating an OOV warning signal if the OOV blob results in a critical situation.

13. The method of claim 12 comprises at least one of:

generating a warning to the driver of the OOV in response to the OOV warning signal; and taking appropriate control of the equipped vehicle by a vehicle control unit in response to the OOV warning signal.

14. The method of claim 12 wherein the situation is critical is critical if a distance of the equipped vehicle to the OOV is within a threshold distance.

15. The method of claim 14 wherein the threshold distance comprises a dynamic threshold distance which can increase or decrease based on threshold distance factors according to information from a depth estimator, a maps unit and a perception unit of an analysis module.

16. The system of claim 15 wherein the threshold distance factors comprise a curvature of a road, sharpness of a turn, road surface conditions, speed of the equipped vehicle, mechanical capabilities of the equipped vehicle or a combination thereof.

* * * * *